United States Patent

Chuta et al.

[11] Patent Number: 5,821,646
[45] Date of Patent: Oct. 13, 1998

[54] SPINDLE MOTOR WITH SEAL STRUCTURE

[75] Inventors: Masanobu Chuta, Shiga-ken; Hiroshi Matsumoto, Hikone; Junko Satake, Mori-machi; Hiromi Iida, Kameoka; Koji Tomita, Takatsuki, all of Japan

[73] Assignee: Nidec Corporation, Kyoto, Japan

[21] Appl. No.: 674,360

[22] Filed: Jul. 1, 1996

Related U.S. Application Data

[62] Division of Ser. No. 198,116, Feb. 17, 1994, Pat. No. 5,596,235.

[30] Foreign Application Priority Data

| Feb. 22, 1993 | [JP] | Japan | 5-57768 |
| Mar. 3, 1993 | [JP] | Japan | 5-42343 |
| Mar. 4, 1993 | [JP] | Japan | 5-69341 |
| Mar. 23, 1993 | [JP] | Japan | 5-89191 |

[51] Int. Cl.$^6$ .............................. H02K 7/00; H02K 11/00
[52] U.S. Cl. ...................... 310/67 R; 310/90; 310/68 R; 360/97.01; 360/99.08
[58] Field of Search .................... 310/90, 67 R, 310/68 R; 360/97.01, 99.08; 277/310, 53

[56] References Cited

U.S. PATENT DOCUMENTS

| 4,458,957 | 7/1984 | Greener | 308/187 |
| 4,894,738 | 1/1990 | Elsasser et al. | |
| 4,953,414 | 9/1990 | Ueno et al. | 74/6 |
| 4,996,613 | 2/1991 | Hishida | 360/99.08 |
| 5,001,581 | 3/1991 | Elsasser et al. | 360/97.02 |
| 5,006,943 | 4/1991 | Elsasser et al. | 360/99.08 |
| 5,009,436 | 4/1991 | Endo et al. | 277/80 |
| 5,045,738 | 9/1991 | Hishida et al. | 310/90 |
| 5,227,686 | 7/1993 | Ogawa | |
| 5,325,004 | 6/1994 | Mori et al. | |
| 5,352,947 | 10/1994 | MacLeod | 310/67 R |
| 5,402,023 | 3/1995 | Nakanishi et al. | |

Primary Examiner—Steven L. Stephan
Assistant Examiner—Elvin G. Enad
Attorney, Agent, or Firm—McCormick, Paulding & Huber

[57] ABSTRACT

A spindle motor comprises a stationary shaft, a rotor hub rotatably mounted by ball bearings to the stationary shaft, and annular sealing members disposed between the outer surface of the stationary shaft and the inner side of the rotor hub axially outwardly of the ball bearings. The sealing member is directly fitted onto the outer race of the corresponding ball bearing. The outer race of each ball bearing is high precision finished so that the sealing member is definitely coaxial with the stationary shaft regardless of the finishing accuracy on the inner side of the rotor hub. Accordingly, the radial distance between the inner side of the sealing member and the outer surface of the stationary shaft can be minimized with high precision offering an excellent labyrinth effect.

21 Claims, 9 Drawing Sheets

SPINDLE MOTOR WITH SEAL STRUCTURE

This is a divisional of application Ser. No. 08/198,116 filed on Feb. 17, 1994, now U.S. Pat. No. 5,596,235.

FIELD OF THE INVENTION

The present invention relates to a spindle motor used for rotation of substantially disks (magnetic disks, optical disks, etc).

DESCRIPTION OF THE PRIOR ART

There have been two types of spindle motors, a shaft stationary model and a shaft rotary model. The shaft stationary type motor comprises a stationary shaft, a hub rotatably mounted by bearings to the stationary shaft, a rotor magnet mounted to the hub, and a stator located opposite to the rotor magnet. The shaft rotary type motor comprises a stationary member, a hub rotatably mounted on the stationary member, a rotary shaft mounted to the hub, bearings mounted between the rotary shaft and the stationary member, a rotor magnet mounted to the hub, and a stator located opposite to the rotor magnet.

Such a spindle motor generally has a labyrinth sealing means or a magnetic fluid sealing means provided on the outside of the bearings for preventing impurities (e.g., drops of grease for lubrication of the bearings) inside the motor interior from escaping out.

One of the labyrinth sealing means in a shaft stationary type spindle motor is disclosed, for example, in FIG. 10 of U.S. Pat. No. 4,894,738. As shown, the labyrinth sealing means incorporates a staggered labyrinth construction formed by a combination of an elaborately shaped stationary sealing member fixedly mounted to the outer surface of a stationary shaft and an elaborately shaped rotary sealing member fixedly mounted directly or by bearing support rings to the inner surface of a hub.

Also, one example of the magnetic fluid sealing means is addressed in FIG. 9 of U.S. Pat. No. 4,894,738. The magnetic fluid sealing means shown comprises an annular mounting member and a magnetic fluid supporting means mounted to the mounting member, in which the mounting means may be secured to a hub (or a stationary member) allowing a magnetic fluid to be filled between the magnetic fluid supporting member and a stationary shaft (or a rotary shaft).

However, the spindle motor of the described type still offers some drawbacks. The labyrinth sealing means produces a path of very small gap between the stationary sealing member and the rotary sealing member of elaborate shape assembled in a combination which ensures a sealing effect as is formed at precision. For implement of the very small gap, it is substantially required to have the stationary and rotary sealing members fabricated with higher accuracy and more particularly, to have the outer surface of the stationary member and the inner surface of the hub finished in higher roundness and situated coaxially. If the inner surface of the hub fails to be finished with a desired precision, the very small gap will be degraded in dimensions. This causes some difficulties in fabrication and assembling of the motor components.

The mounting member of the magnetic fluid sealing means is commonly bonded by adhesive to the hub (or the stationary member). If the bonding with adhesive is furnished inadequate (i.e. a less amount of an adhesive is applied), there is developed a minimal space between the mounting member and the hub (or the stationary member). Also, grease for the bearings commonly tends to have its oil substances liberated after a considerable length of service. As the oil substances have been liberated in a motor with its mounting member being poorly bonded, they begin to flow into and through the space between the mounting member and the hub (or the stationary member) and move towards recording disks which will eventually be fouled on the surfaces.

It is understood that the foregoing drawbacks are common not only in the magnetic fluid sealing means but also in the labyrinth sealing means.

SUMMARY OF THE INVENTION

It is a first object of the present invention to provide a spindle motor having a sealing member arranged coaxially of its stationary shaft at high precision and more specifically, in which the inner side of the sealing member is radially spaced by a uniform minimal distance from the outer surface of the stationary shaft as having been finished and installed at high precision and efficiency thus offering an improved labyrinth sealing means.

It is a second object of the present invention to provide a spindle motor in which undesired oil substances liberated from the grease in the ball bearings is practically prevented from leaking out of the motor.

Other objects and features of the present invention will be apparent from the following description.

DETAILED DESCRIPTION OF THE PREFERRED EMBODIMENTS

The preferred embodiments of the present invention will be described in more details in conjunction with the accompanying drawings.

Figure 1:
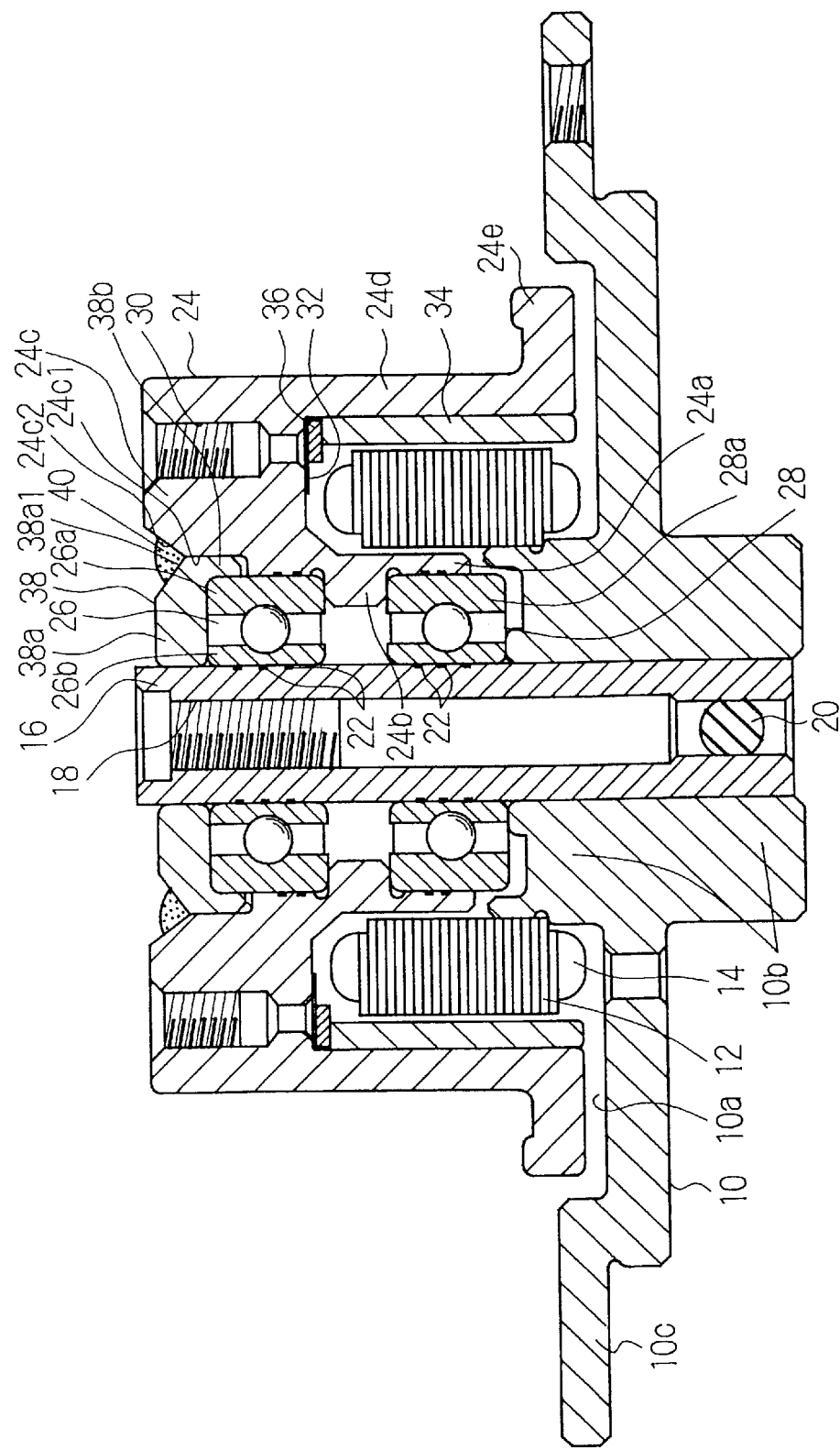
FIG. 1 is a cross sectional view of a spindle motor showing a first embodiment of the present invention.

Referring to FIG. 17 a spindle motor of the first embodiment of the present invention will now be explained. FIG. 1 is a cross sectional view of the spindle motor designed for hard disk drive. It is known that the spindle motors according to the present invention are equally applicable to drive other recording mediums or the like than hard disks.

There is provided a bracket 10 having a vertically extending cylindrical portion 10b provided in the center of an upward opening annular recess 10a thereof and a flange portion 10c provided on the circumference of the annular recess 10a. The bracket 10 may alternatively be arranged integral with a base of a hard disk drive apparatus. The lower part of a stator core 12 is fitted on to the upper part of the cylindrical portion 10b. The stator core 12 carries a stator coil 14 wound thereon. The cylindrical portion 10b accepts the lower part of a stationary shaft 16 of approximately tubular shape fitted therein by pressing. The stationary shaft 16 has a center hollow therein provided at upper end with a thread 18 and at lower end with a separate rubber ball 20 for sealing. The outer surface of the stationary shaft 16 has two groups of adhesive grooves 22 formed in the upper part thereof for holding an adhesive to bond ball bearings.

A rotor hub 24 incorporates a two-cylinder configuration having an inner wall 24a and an outer wall 24d. The rotor hub 24 is rotatably mounted to the stationary shaft 16 by two, upper and lower, ball bearings 26, 28 bonded to the upper part of the stationary shaft 16. More specifically, the inner wall 24a has an inwardly projecting positioning rib 24b by which sides the outer races 26a and 28a of their respective upper 26 and lower ball bearings 28 are supported. The upper ball bearing 26 at least is finished with such a precision that the outer side of its outer race 26a and the inner side of its inner race 26b can be coaxial.

A bottom portion 24c of the rotor hub 24 is located at uppermost having screw holes 30 therein for tightening a clamp (not shown) to hold a set of hard disks (not shown) fitted on the outer wall 24d and seated on a flange portion 24e of the rotor hub 24. The lower openings of the screw holes 30 are closed with sealers 32 bonded to the lower surface of the bottom portion 24c. The inner side 24c1 of the bottom portion 24c is slightly greater in radius than the inner side of the inner wall 24a. The bottom portion 24c is beveled at the upper inside corner forming a slope 24c2. The flange 24e extends outwardly from the lowermost of the outer wall 24d of the rotor hub 24 so that its axially half portion is accepted in the annular recess 10a of the bracket 10.

A rotor magnet 34 of tubular shape is fixedly mounted to the inner side of the outer wall 24d of the rotor hub 24 so that it faces the stator core 12 at a very small radial distance. A spacer 36 is inserted between the sealers 32 and the rotor magnet 34.

An annular sealing member 38 comprises a horizontal portion 38a and a hanger portion 38b provided radially downwardly of the horizontal 38a. The horizontal portion 38a is beveled at the upper outside corner forming a slope 38a1. In particular, the sealing member 38 is finished with such a precision that the inner side of its hanger portion 38b and the inner side of its horizontal portion 38a can be coaxial. Also, it is designated so that the clearance or fitness between the outer side of the outer race 26a of the upper ball bearing 26 and the inner side of the hanger portion 38b of the sealing member 38 is minimum or optimum. The sealing member 38 is secured with its hanger portion 38b fitted closely onto the outer race 26a of the upper ball bearing 26. The inner side of the horizontal portion 38a of the sealing member 38 and the outer side of the stationary shaft 16 are confronted with each other at a very small radial distance or labyrinth gap. The stationary shaft 16 is finished so that the roundness of its outer surface is optimum at least where the inner race 26b of the upper ball bearing 26 is fitted and where the inner side of the horizontal portion 38a of the sealing member 38 is placed. The outer diameter of the hanger portion 38b is slightly smaller than the inner diameter of the inner side 24c1 of the bottom portion 24c of the rotor hub 24.

The sealing and bonding between the sealing member 38 and the rotor hub 24 is by applying an adhesive 40 along the slope 38a1 of the horizontal portion 38a of the sealing member 38 and the slope 24c2 of the bottom portion 24c of the rotor hub 24. The angle between the two slopes 38a1 and 24c2 is substantially obtuse thus to prevent at its best the adhesive 40 from removing off if the sealing member 38 is dislocated from the rotor hub 24 due to a difference in the thermal expansion.

Accordingly, in the spindle motor of the first embodiment, the hanger portion 38b of the sealing member 38 is directly fitted onto the high precision machined outer race 26a of the upper ball bearing 26 enhancing the alignment of the sealing member 38 to the stationary shaft 16 regardless of a finishing accuracy on the inner side of the rotor hub 24. More particularly, the horizontal portion 38a of the sealing member 38 is very closely fitted onto the stationary shaft 16 so that the radial distance inbetween (of e.g. 25 micrometers) is uniform and correct throughout their circumference. As the result, the sealing effect is increased effectively preventing the lubricant in the upper ball bearing 26 from escaping and impairing the hard disk unit. Also, steps for the production of the motor will be minimized in number thus increasing the productive efficiency.

In addition, the labyrinth effect is achieved by a combination of between the lower end of the inner wall 24b of the rotor hub 24 and the upper end of the cylindrical portion 10b of the bracket, between the outer side of the inner wall 24a and the inner side of the stator core 12, and between the lower and outer sides of the flange portion 24e of the rotor hub 24 and the bottom and inner wall of the annular recess 10a of the bracket 10 respectively, preventing lubricant in the lower ball bearing 28 or any other impurities from spilling out.

A spindle motor of the second embodiment of the present invention will now be described in details referring to FIG. 2.

Figure 2:
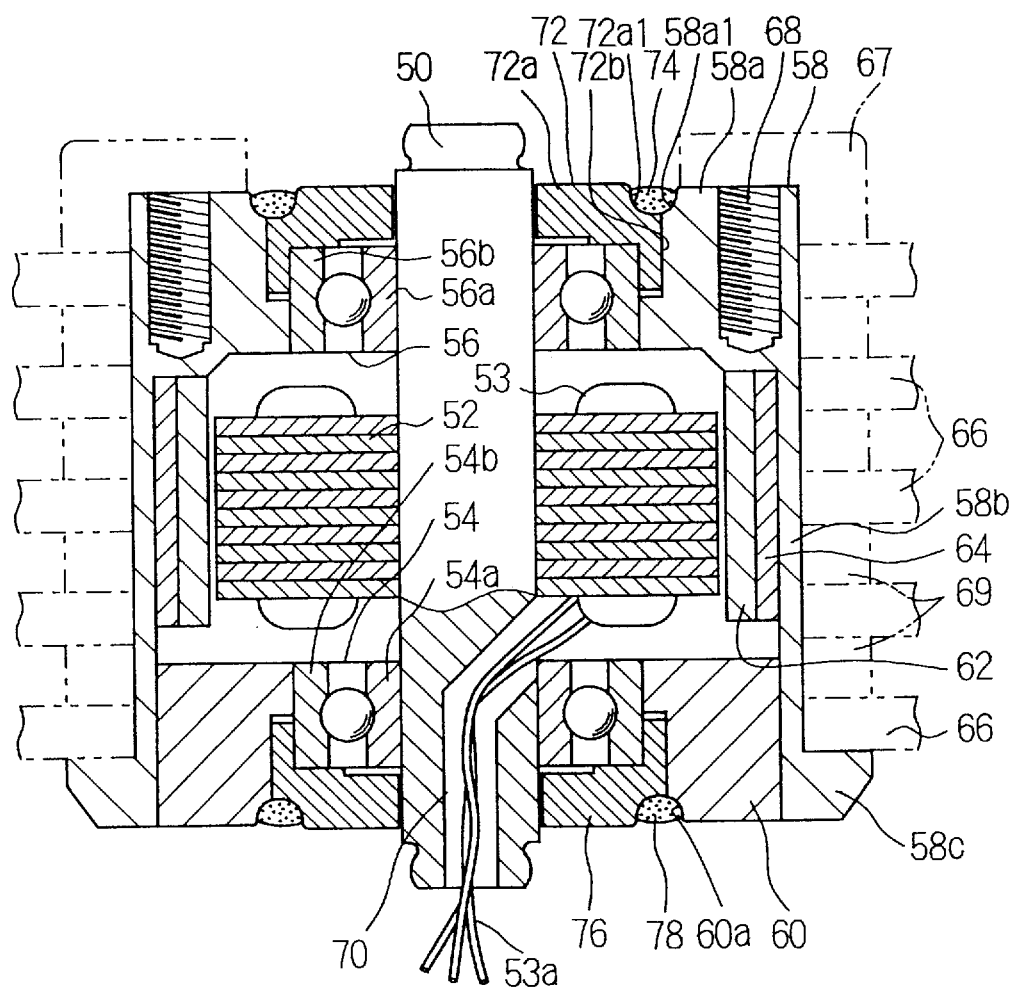
FIG. 2 is a cross sectional view of a spindle motor showing a second embodiment of the present invention.

FIG. 2 illustrates the spindle motor for hard disk drive, in which a stationary shaft 50 of approximately column shape is vertically mounted on the base of a hard disk drive apparatus. A stator core 52 is fixedly fitted onto a center part of the stationary shaft 50 and carries a stator coil 53 wound thereon. Also, fitted onto a lower and an upper parts of the stationary shaft 50 are the inner race 54a of a lower ball bearing 54 and the inner race 56a of an upper ball bearing 56 respectively.

A rotor hub 58 of inverted bowl shape includes a proximal portion 58a having an opening at the center and is rotatably mounted by the upper and lower ball bearings 56, 54 to the stationary shaft 50. More specifically, the rotor hub 58 is coupled at the lower end of its wall portion 58b by an annular member 60 to the outer side of the outer race 54b of the lower ball bearing 54 and at the inner side of the proximal portion 58a to the outer side of the outer race 56b of the upper ball bearing 56. A rotor yoke 64 which holds a rotor magnet 62 therein is fitted into a wall portion 58b of the rotor hub 58. The rotor magnet 62 is spaced by a small radial gap from the stator core 52. The proximal portion 58a of the rotor hub 58 has screw holes 68 for tightening a clamp 67 to hold a set of hard disks 66 fitted onto the wall portion 58b and seated on a flange portion 58c of the rotary hub 58. The hard disks 66 are spaced one another by a number of spacers 69. The stator coil 53 has lead lines 53a extending downwardly through a lead aperture 70 in the stationary shaft 50 communicated from the interior of the motor to the outside.

The inner side of the proximal portion 58a of the rotor hub 58 is slightly enlarged at uppermost in a radial direction and also beveled at the upper inside corner forming a J-shaped slope 58a1. Similarly, the inner side of the annular member 60 is slightly enlarged at lowermost in a radial direction and beveled at the lower inside corner forming a J-shaped slope 60a.

An annular upper sealing member 72 has a horizontal portion 72a and a hanger portion 72b provided outwardly downwardly of the horizontal portion 72a. The hanger portion 72b is beveled at the upper outside corner forming a J-shaped slope 72a1. The upper sealing member 72 is finished with such a precision that the inner sides of its horizontal 72a and hanger portions 72b are coaxial. Also, it is so arranged that the clearance or fitness between the outer side of the outer race 56b of the upper ball bearing 56 and the inner side of the hanger portion 72b of the upper sealing member 72 is minimum or optimum. The inner side of the hanger portion 72b of the upper sealing member 72 is tightly fitted onto the outer side of the outer race 56b of the upper ball bearing 56. The inner side of the horizontal portion 72a of the upper sealing member 72 faces at a very small radial distance or labyrinth gap the outer side of the stationary shaft 50. Also, it is so designated that the roundness of the outer surface of the stationary shaft 50 is optimum at least where the inner race 56a of the upper ball bearing 56 is fitted and where the inner side of the horizontal portion 72a of the upper sealing member 72 is placed. The outer diameter of the hanger portion 72b is slightly smaller than the inner diameter of the enlarged part of the proximal portion 58a of the rotor hub 58.

An amount of adhesive 74 is applied to a groove of U shape in cross section defined between the slope 72a1 of the upper sealing member 72 and the slope 58a1 of the proximal portion 58a of the rotor hub 58. Thus, the sealing and bonding between the upper sealing means 72 and the proximal portion 58a of the rotor hub 58 is achieved with the adhesive 74. Since the angle between the two slopes 72a1 and 58a1 is obtuse, the adhesive 74 can positively be prevented from removing off if the upper sealing means 72 and the rotor hub 58 are dislocated from each other due to a difference in the thermal expansion.

Accordingly, the spindle motor of the second embodiment allows the hanger portion 72b of the upper sealing member 72 to be very closely fitted onto the outer race 56a of the upper ball bearing 56 enhancing the alignment of the upper sealing member 72 to the stationary shaft 50 regardless of a finishing accuracy on the inner side of the rotor hub 24. More particularly, the horizontal portion 72a of the upper sealing member 72 and the outer surface of the stationary shaft 50 are directly confronted to each other at a uniform, minimum radial distance throughout the circumference. As the result, the sealing effect is increased effectively preventing the lubricant in the upper ball bearing 56 from escaping and impairing the hard disks or other components. Also, steps for the production of the motor will be minimized in number thus increasing the productive efficiency.

The arrangement of an annular lower sealing member 76, an annular member 60, and an adhesive 78 is implemented by the same manner as for the above described assembly of the upper sealing member 72, the proximal portion 58a of the rotor hub 58, and the adhesive 74, thus ensuring a similar effect.

A spindle motor of the third embodiment of the present invention will be described in details referring to FIGS. 3 and 4.

Figure 3:
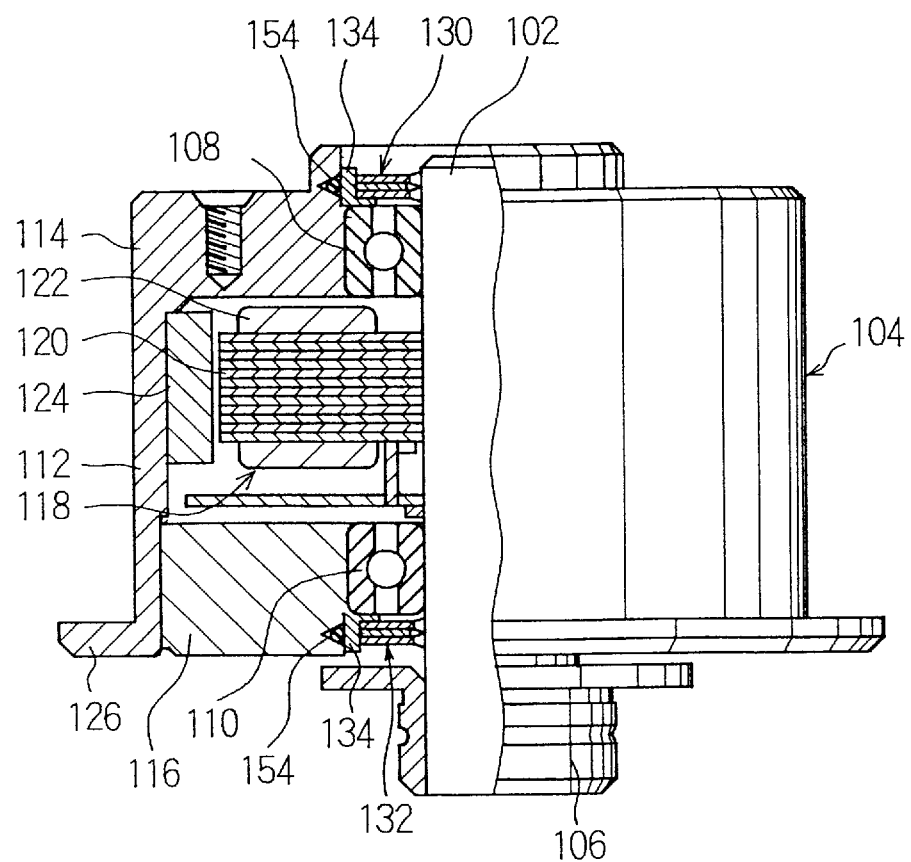
FIG. 3 is a partially cross sectional view of a spindle motor showing a third embodiment of the present invention.

As shown in FIG. 3, the spindle motor comprises mainly a stationary shaft 102 and a hub 104 arranged for rotation relative to the stationary shaft 102. A cup-like member 106 is fixedly mounted to the lowermost of the stationary shaft 102, which is coupled to a lower frame (not shown) of a disk drive apparatus.

Two ball bearings 108 and 110 are mounted to both ends of the stationary shaft 102 respectively, rotatably supporting the hub 104. The hub 104 comprises a cylindrical hub body 112, an end plate 114 mounted to one end of the hub body 112, and an annular support 116 mounted to the other end of the hub body 112. The end plate 114 is directly supported by the upper ball bearing 108 and the hub body 112 is supported via the annular support 116 by the lower ball bearing 110.

A stator 118 is mounted to an intermediate part of the stationary shaft 102 (between the two ball bearings 108 and 110), which comprises a stator core 120 fixedly mounted to the stationary shaft 102 and an armature coil 122 wound in a given manner along a toothed side of the stator core 122. An annular rotor magnet 124 is mounted to the inner side of the hub body 112 so that it is placed opposite to and outwardly of the stator 118. The hub body 112 has at its open end a flange portion 126 provided on the outer side thereof for holding a plurality of recording disks (not shown), e.g. magnetic disks, which are arranged vertically at equal intervals.

Two magnetic fluid sealing means 130 and 132 are provided on the outside of the upper 108 and lower ball bearings 110 respectively, which are identical in construction. One of the two identical magnetic fluid sealing means 130, 132 will now be explained in more detail. As best shown in FIG. 4, the magnetic fluid sealing means 130 (132) comprises an annular rack 134 and a magnetic fluid holder 136 mounted on the annular rack 134. The magnetic fluid holder 136 consists mainly of an annular permanent magnet 138 and a pair of pole pieces 140 and 142 sandwiching the permanent magnet 138 from both sides. The rack 134 has an inward flange portion 144 extending radially inwardly thereof. The magnetic fluid holder 136 is supported on the flange portion 144 and securely bonded to the inner side of the rack 134.

The two magnetic fluid sealing means 130 and 132 are installed in the following manner. For installation of the magnetic fluid sealing means 130, its rack 134 is positioned as placed on a shoulder provided on the inner side of the end plate 114 of the hub 104 and bonded at the outer side to the end plate 114. For installation of the other magnetic fluid sealing means 132, its rack 134 is positioned as placed on a shoulder provided on the inner side of the hub support 116 and bonded at the outer side to the support 116. A magnetic fluid 146 of an appropriate type is applied to fill a clearance between the magnetic fluid holder 136 (more precisely, the two pole pieces 140 and 142) of each magnetic fluid sealing means 130 or 132 and the outer surface of the stationary shaft 102.

Accordingly, the two magnetic fluid sealing means 130 and 132 are placed in the predetermined positions sealing up both ends of the spindle motor. As the result, grease in the ball bearings 108 and 110 and other impurities inside the motor will positively be prevented from escaping towards the outside.

In addition, the spindle motor of the third embodiment contains oil absorbing means arranged on the outside of the two ball bearings 130 and 132 respectively. The end plate 114 of the hub 104 has an annular recess 150 provided in the inner side thereof, close to the ball bearing 108. The hub support 116 has an annular recess 152 provided in the inner side thereof, adjacent to the other ball bearing 110. The two annular recesses 150 and 152 accommodate the oil absorbing means. The cross sectional shape of the two recesses 150 and 152 may be appropriate and V-shaped as shown in this embodiment. The oil absorbing means may be selected from any oil absorbent materials including cellulose, foamed resin, and porous rubber. A preferable type of the oil absorbing means is a ring-shaped resilient material 154 as used in this embodiment. It is intended that the ring absorbent means 154 is slightly yielded while the magnetic fluid sealing means 130 (or 132) being installed in its position and then, remains to close up between the end plate 114 (or the support 116) of the hub 104 and the rack 134 of the magnetic fluid sealing means 130 (or 132).

In action, when oil substance has been separated from the grease in the ball bearing 108, it starts to flow outwardly from between the inner 156 and outer races 158 to the outside as being driven by a centrifugal force of the rotation of the hub 104. However, the rack 134 of the magnetic fluid sealing means 130 is very tightly fitted to the end plate 114 of the hub 104 and allows no portion of the oil substance to move towards the outside of the motor. In case that the coupling between the end plate 114 of the hub 104 and the rack 134 of the magnetic fluid sealing means 130 is degraded or becomes loose during service, a portion of the oil may move further to sneak into a gap between the same. Then, its flow will successfully be stopped by the oil absorbing means 154 accommodated in the recess 150 of the end plate 114 as prevented from running outward. The other side of the motor at the ball bearing 110 will act the same.

Figure 5:
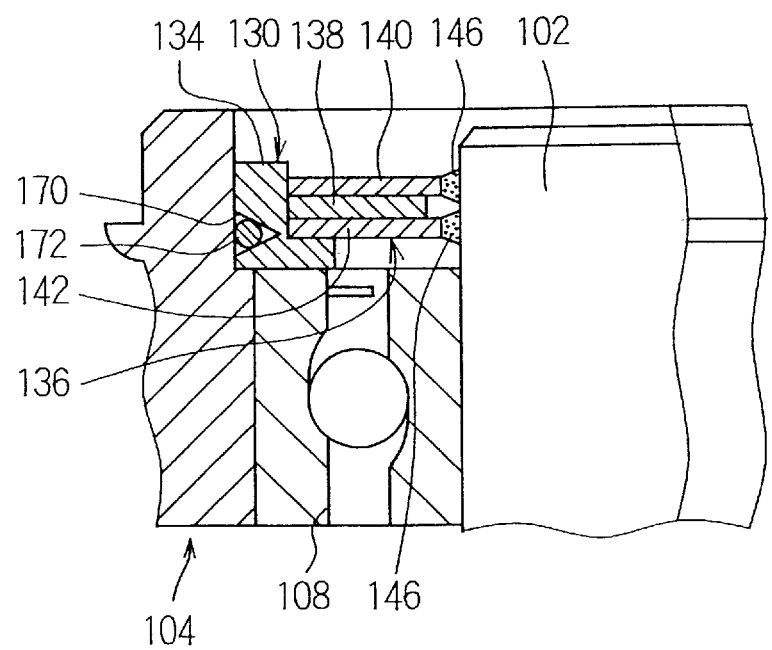
FIG. 5 is a cross sectional view of the sealing region of a modification of the spindle motor shown in FIG. 3.

FIG. 5 shows a modification of the third embodiment, in which the oil absorbing means is arranged on the rack 134 of the magnetic fluid sealing means 130. As shown, the modification is specifically applied to the ball bearing 108 side of the motor where the rack 134 of the magnetic fluid sealing means 130 has an annular recess 170 provided in the outer side thereof for accommodation of the oil absorbing means or ring absorbent material 172.

This modification also permits a portion of the oil substance escaped from the ball bearing 108 to be stopped and absorbed by the ring absorbent material 172, causing no oil leakage. Accordingly, the same effect as of the third embodiment shown in FIGS. 3 and 4 will be achieved with the modification.

Figure 4:
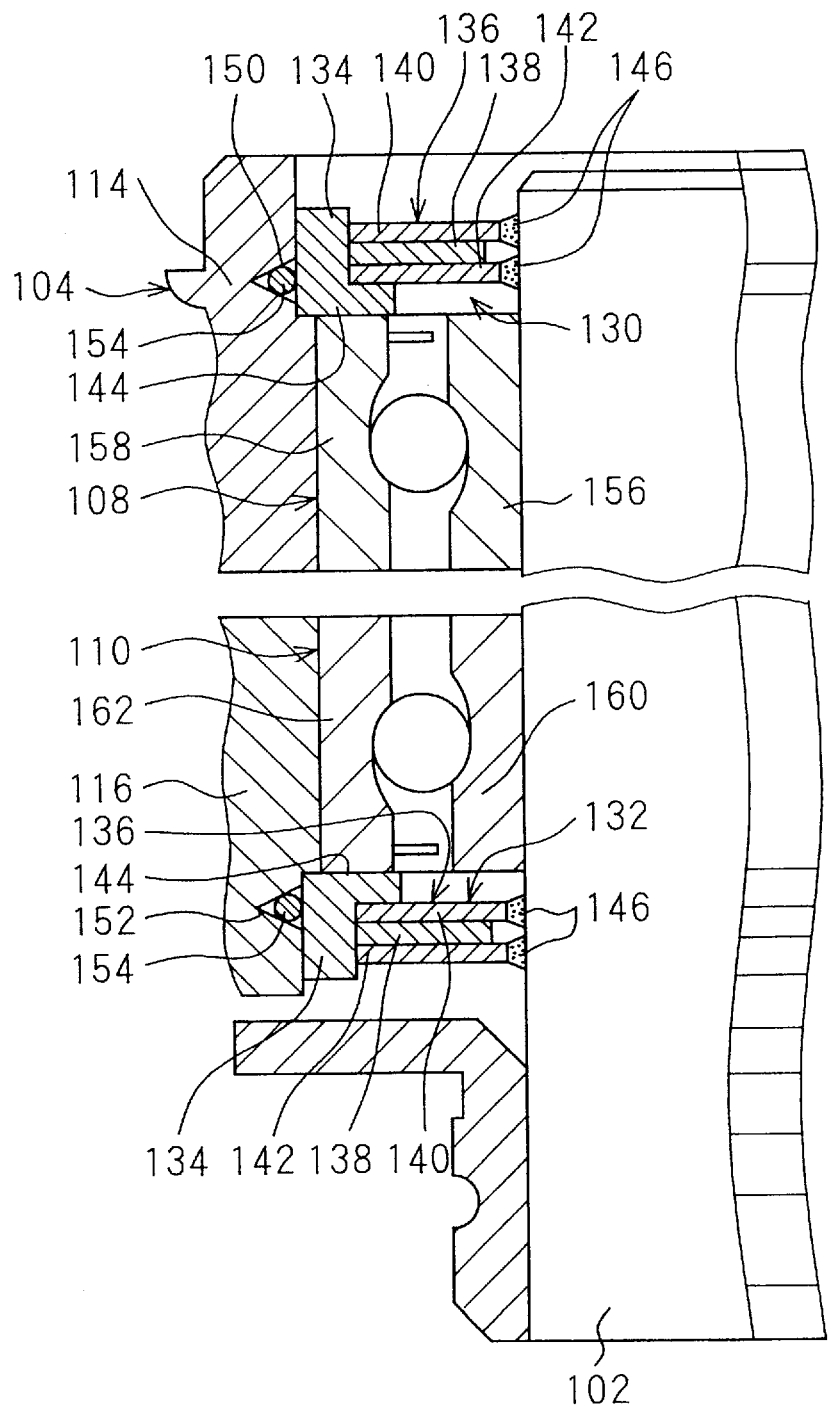
FIG. 4 is an enlarged cross sectional view of the sealing region of the spindle motor shown in FIG. 3.

Although a single of the ring absorbent material 154 or 172 is disposed on the outside of the ball bearing 108 (110) according to the third embodiment of FIGS. 3 to 5, a plurality of the same will be arranged at proper intervals for absorption of more amounts of the oil substance.

It would be understood that the present invention is not limited to the stationary-shaft type spindle motors of the foregoing embodiments where, for example, a hub 104 is rotated relative to a stationary shaft 102 but applicable to rotary-shaft type spindle motors with equal success. In a rotary-shaft type spindle motor, a hub is rotatably supported by a stationary base and more particularly, a rotary shaft mounted to the hub is mounted by ball bearings to the stationary base. The magnetic fluid holder of each magnetic fluid sealing means is therefore mounted to either the stationary base or the rotary shaft.

Although the third embodiment is described in the form of a spindle motor having the magnetic fluid sealing means 130 and 132 disposed outwardly of the ball bearings 108 and 110 respectively, its scheme is applicable to another type of spindle motors where a labyrinth sealing arrangement or cap sealing means is employed.

A spindle motor of the fourth embodiment of the present invention will now be described referring to FIG. 6. As apparent, like components are denoted by like numbers as those shown in FIG. 3 and 4 for ease of the explanation.

The spindle motor of the fourth embodiment employs a specific arrangement for preventing separated oil in two ball bearings 108 and 110 from flowing towards the outside. In the arrangement, the annular rack 134 of a magnetic fluid sealing means 130 (or 132) has an annular trap recess 180 provided in the outer side thereof at the outside of the ball bearing 108 (or 110). The trap recess 180 is slightly wider at the opening. Also, its lower (or upper) edge extends in horizontal and its upper (or lower) edge is moderately tilted down toward the innermost, as shown in FIG. 6. The trap recess 180 is communicated at the innermost with a plurality of small storage channels 182 (only one shown in FIG. 6) arranged at intervals in the circumferential direction. The storage channels 182 extend from the trap recess 180 to the upper end of the ball bearing 108 (or 110) for receipt and storage of escaped oil. Four of the storage channels 182 are adequate to store an escaped portion of the liberated oil. A more number of the storage channels 182 may be provided for holding an extra of the oil.

In action, when an oil substance has been separated from the grease in the ball bearing 108, it tends to flow outwardly from between the inner 156 and the outer races 158 of the ball bearing 108 as being driven by a centrifugal force of the rotation of a hub 104. As the annular rack 134 of the magnetic fluid sealing means 130 is correctly fitted against an end plate 114 of the hub 104, no portion of the oil substance runs further and will be prevented from leaking out of the motor. If the fitness between the rack 134 and the hub plate 114 is degraded or becomes loose, a portion of the oil substance may run outwardly from between the rack 134 of the magnetic fluid sealing means 130 and the outer race 158 of the ball bearing 108 to between the rack 134 and the end plate 114 of the hub 104. However, before reaching the outward end of the annular rack 134, it is trapped by the trap recess 180 and then, drawn by means of capillary action into the storage channels 182 where it is stored. As the result, leakage of the separated oil will be avoided definitely. The other side of the motor at the ball bearing 110 will provide the same effect.

Figure 7:
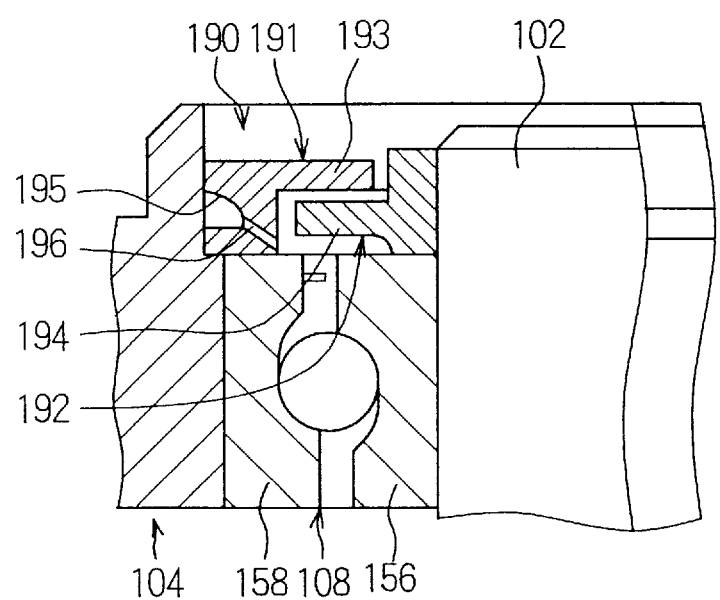
FIG. 7 is a cross sectional view of the sealing region of a modification of the spindle motor shown in FIG. 6.

FIG. 7 illustrates a modification of the fourth embodiment where the magnetic fluid sealing means is replaced with a labyrinth sealing means 190. The labyrinth sealing means 190 comprises a first member 191 mounted to a hub 104 and a second member 192 mounted to a shaft 102. More specifically, the first member 191 is bonded by an adhesive as directly seated on a shoulder provided on the inner side of this hub 104 and the outer race 158 of a ball bearing 108. The first member 191 has a flange portion 193 thereof extending radially inwardly. The second member 192 is also bonded by the adhesive as seated directly on the inner race 156 of the ball bearing 108. Similarly, the second member 192 has a flange portion 194 thereof extending radially outwardly. The flange portion 193 of the first member 191 and the flange portion 194 of the second member 192 are overlapped to each other at a very small interval axially of the motor, forming a labyrinth sealing construction in the combination. An annular trap recess 195 similar to the above described is provided in the outer side of the first member 191, being communicated at the innermost with a plurality of small storage channels 196 (only one shown in FIG. 7) arranged at given intervals in the circumferential direction. The storage channels 196 extend from the trap recess 195 throughout the first member 191 to the upper end of the ball bearing 108.

As apparent, an escaped portion of the oil substance from between the inner 156 and the outer races 158 of the ball bearing 108 runs outwardly as being driven by a centrifugal force of the rotation of the hub 104 and if the coupling between the hub 104 and the first member 191 of the labyrinth sealing means 190 is degraded or becomes loose, tends to flow further from between the outer race 158 and the first member 191 to between the hub 104 and the first member 191. This modification like the original arrangement of the fourth embodiment allows the escaped portion of the oil to be intercepted by the annular trap recess 195 of the first member 191 and drawn by the capillary action into the storage channels 196 for storage. The advantage of the modification is hence identical to that of the fourth embodiment shown in FIG. 6.

Figure 6:
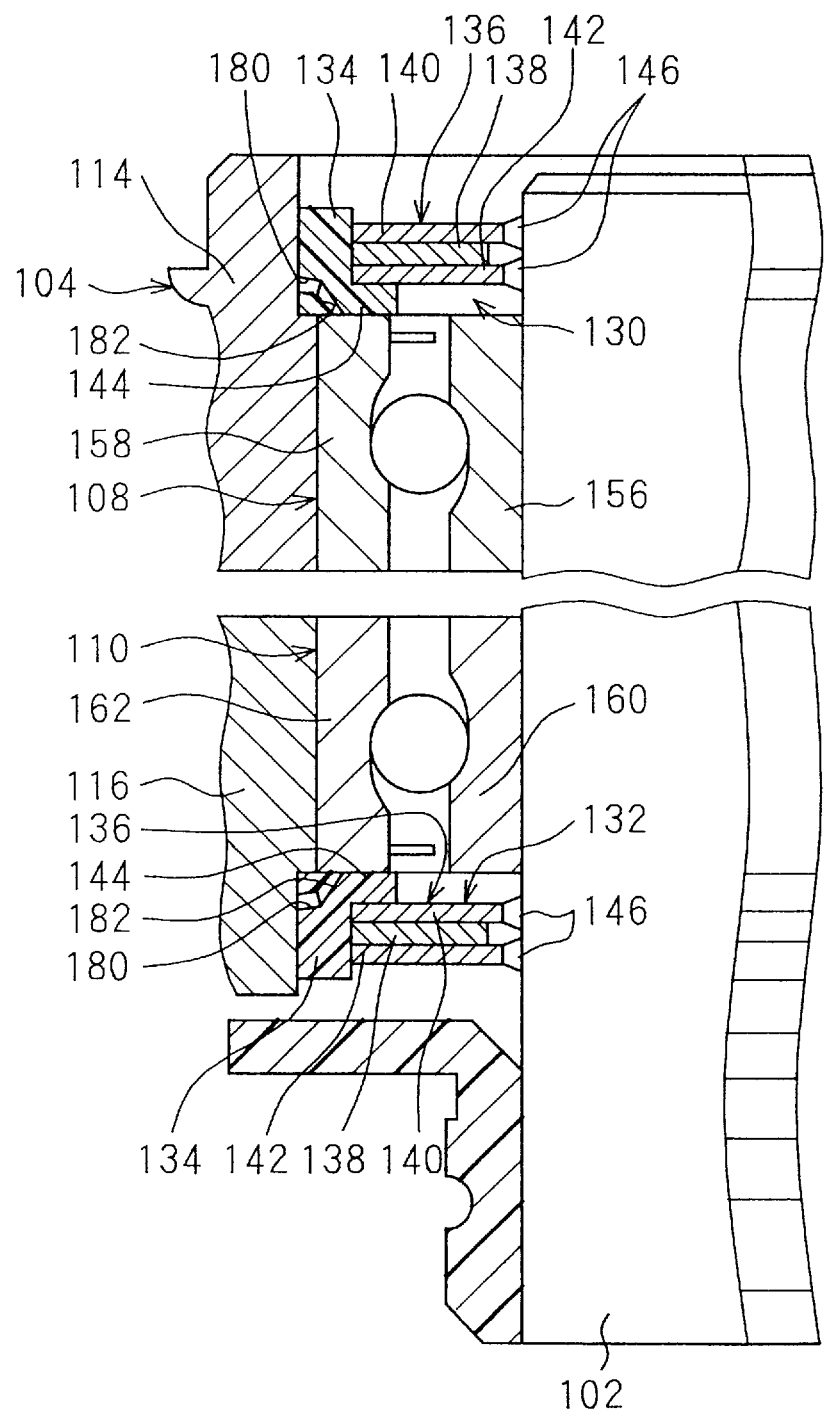
FIG. 6 is a cross sectional view of a spindle motor showing a fourth embodiment of the present invention.

Although a single of the annular trap recess 180 (195) is formed in the annular racks 134 of the magnetic fluid sealing means 130 and 132 (or the first member 191 of the labyrinth sealing means 190) according to the fourth embodiment of FIG. 6 (and 7), a plurality of the same will be arranged at proper intervals for absorption of more amounts of the escaped oil substance. (Also, a more number of the storage channels may be provided in that connection.)

It would be understood that the spindle motor of the fourth embodiment is not limited to stationary-shaft type spindle motors where the hub 104 rotates relative to the stationary shaft 102 but may be of a rotary-shaft type with equal success.

Figure 8:
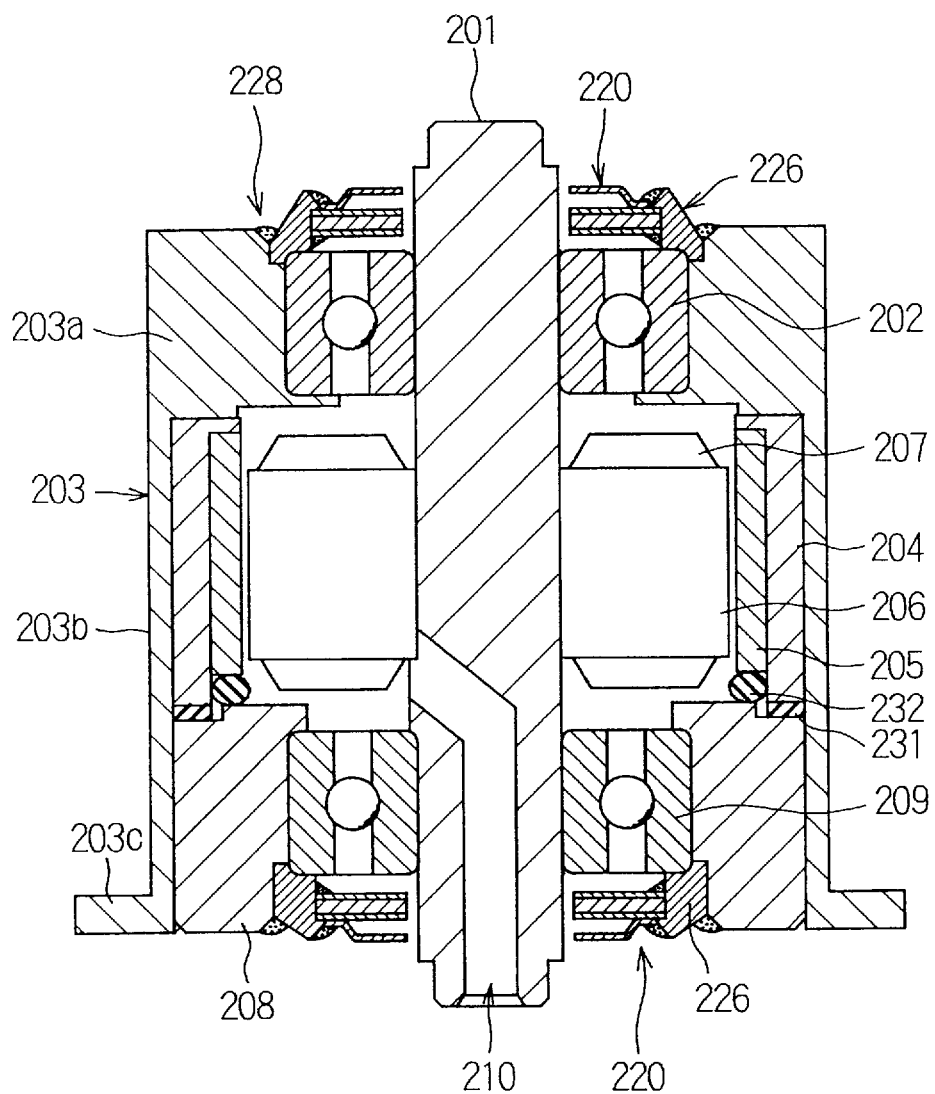
FIG. 8 is a cross sectional view of a spindle motor showing a fifth embodiment of the present invention.

A spindle motor of the fifth embodiment of the present invention will be described in mode details referring to FIGS. 8 and 9.

As shown, the spindle motor of the fifth embodiment is for actuating the rotation of disks in a hard disk drive, apparatus and of which stationary shaft 201 is fixedly mounted to a base or motor bracket of the apparatus. A hub 203 is rotatably mounted by an upper ball bearing 202 to the outer surface of the stationary shaft 201.

The hub 203 has an inverted-U shape in cross section and contains a magnet 205 mounted by a yoke 204 to the inner side thereof. The hub 203 comprises a proximal portion 203, an extend portion 203b hanging vertically from the outer edge of the proximal portion 203a, and a flange portion 203c provided at the lower end of the extend portion 203b. A plurality of magnetic disks are installed as supported by the flange portion 203c. A stator core 206 is mounted on the outer surface of the stationary shaft 201 so that it faces the magnet 205 on the hub 203. The stator core 206 has a coil 207 wound thereon. An annular bushing 208 is mounted to the inner side of the extend portion 203b of the hub 203 and coupled by a lower ball bearing 209 to the stationary shaft 201. The stationary shaft 201 has a through hole 210 provided therein for extending lead lines which energize the coil 207.

Magnetic fluid sealing means 220 are disposed on the two, upper and lower, ends of the stationary shaft 201 respectively. As illustrated in FIG. 8, the two sealing means 220 are substantially identical in the construction although one being located between the hub 203 and the stationary shaft 201 and the other between the bushing 208 and the shaft 201. The upper one between the hub 203 and the shaft 201 only will be explained.

Figure 9:
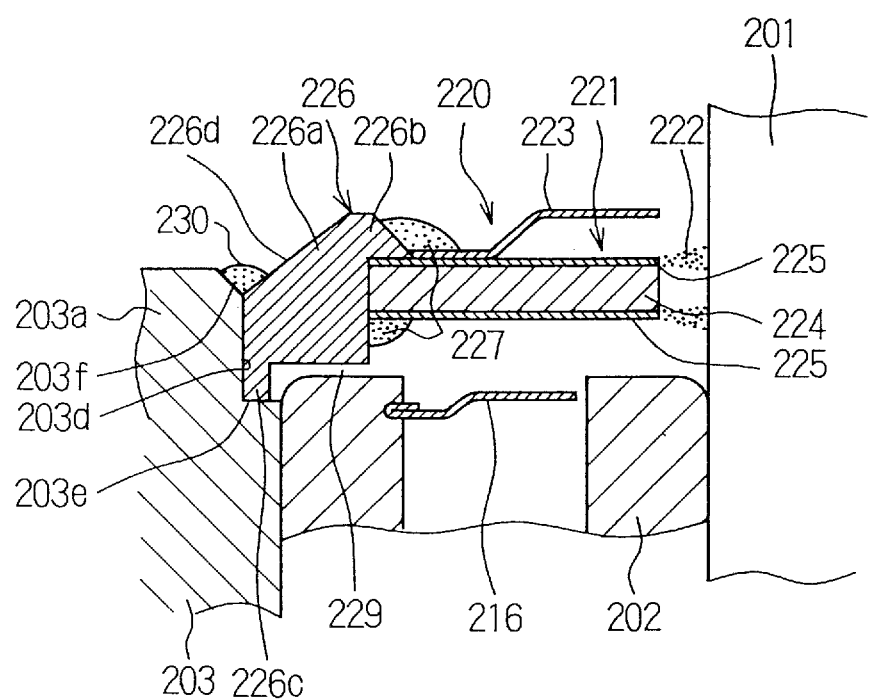
FIG. 9 is a partially cross sectional view of the sealing region of the spindle motor shown in FIG. 8.

FIG. 9 shows an enlarged view of the upper magnetic fluid sealing means 220 which comprises a ring-like magnetic plate 221, a magnetic fluid 222 held at one end of the magnetic plate 221, and a ring-like protective cap 223 mounted outwardly of the magnetic plate 221. The magnetic plate 221 comprises an annular spacer 224 and a pair of magnetic pole plates 225 sandwiching the spacer 224 from both sides.

The magnetic plate 221 and the protective cap 223 of the magnetic fluid sealing means 220 are supported by an annular bushing 226 of substantially a triangle shape in cross section. The annular bushing 226 comprises a main body 226a, an annular rib 226b projecting from the upper inner side of the main body 226a, and an annular projection 226c projecting downwardly from the lower side edge of the main body 226a. The main body 226a is beveled at the upper outside corner forming a taper surface 226d.

The hub 203 also has an annular step 203e and a taper surface 203f arranged at the upper inside corner of the proximal portion 203a which has at the center an opening 203d for accommodating the upper ball bearing 202. For installation of the magnetic fluid sealing member 220 to the annular bushing 226, its upper magnetic plate 221 is placed from below against the lower side of the rib 226b and its protective cap 223 is seated in a coaxial position on the upper magnetic plate 221. Then, amounts of adhesive 227 are applied to bond those components together.

In succession, the projection 226c of the annular bushing 226 is placed on the step 203e of the proximal portion 203a of the hub 203. As the result, the taper surface 226d of the bushing 226 meets at the lowermost the lower edge of the tape surface 203f of the hub 203, forming substantially a 90° V-shaped space inbetween to which ultraviolet ray is irradiated. Simultaneously, a very small clearance or labyrinth gap 229 is created between the upper side of the outer race of the ball bearing 202 and the lower side of the annular bushing 226. When the V-shaped space 228 has been filled with an amount of ultraviolet curing adhesive 230 as followed by the irradiation of ultraviolet rays, the annular bushing 226 is secured to the hub 203.

Rubber rings 231 and 232 of annular shape are inserted between the yoke 204 and the bushing 208 and between the magnet 205 and the bushing 208 respectively. Due to this resiliency of the rubber rings 231 and 232, both the yoke 204 and the magnet 205 are secured to the hub 203 with no use of adhesive. More specifically, the yoke 204 and the magnet 205 are fitted into the hub 203 without adhesive as they are being urged by the recovering force of the rubber rings 231 and 232 against the lower side of the proximal portion 203a of the hub 203. Accordingly, no application of a particular adhesive is needed thus preventing unwanted events, e.g. a decrease in the bonding strength or a bleeding due to immature curing of the adhesive. Also, the process for production has no curing time and will be increased in the efficiency.

In action, if a gas of lubricant escaped from the ball bearing 202 passes a shielding plate 216 mounted to the outer race of the bearing 202, it is eventually trapped by the labyrinth gap 229 between the ball bearing 202 and the annular bushing 226. There will thus be a less possibility of allowing at escaped portion of the lubricant to move into a disk chamber above.

Furthermore, if the escaped portion of the lubricant passes through the labyrinth gap 229, it will be blocked by the downwardly extending projection 226c of the annular bushing 226 disposed at the end of the labyrinth gap 229. It is now understood that almost no portion of the lubricant will enter the disk chamber above the motor.

According to the fifth embodiment, the two taper surfaces 226d and 203f of the annular bushing 226 and the hub 203 respectively are confronted to each other as the annular bushing 226 remains seated on the step 203e of the hub 203, forming the V-shaped space 228 therebetween. Thus, the adhesive 230 filled in the space 228 can explicitly be exposed to the irradiation of ultraviolet rays for ease of the curing action.

It should be understood that the present invention is not limited to the spindle motors of the above described embodiments and various modifications and changes are possible without departing the scope of the present invention.

We claim:

1. A spindle motor comprising:

a stationary shaft;

a rotor hub rotatable relative to the shaft;

upper and lower ball bearings having outer races filled with lubricant and mounted on the shaft at upper and lower portions thereof for supporting the hub;

a rotor magnet mounted on the hub;

a stator mounted on the shaft so as to face the rotor magnet;

a ferrofluidic seal having an annular holding member mounted on the hub and an outer ball bearing race, the ferrofluidic seal disposed axially outside of the upper and lower bearings; and an oil absorbing means disposed between the hub and the annular holding member for absorbing the lubricant oozing from the bearing.

2. A spindle motor according to 1 wherein the annular absorbing member is made of elastic material like and has an inner diameter slightly larger than an outer diameter of the annular holding member.

3. A spindle motor according to claim 1, wherein the oil absorbing means includes an annular recess formed on the rotor hub and an annular absorbing member accommodated in the annular recess so as to be in contact with an outer peripheral surface of the annular holding member.

4. A spindle motor according to claim 1, wherein the oil absorbing means includes an annular recess formed on the annular holding member and an annular absorbing member accommodated in the annular recess so as to be in contact with an outer peripheral surface of the annular rotor hub.

5. A spindle motor comprising:

a stationary shaft;

a rotor hub rotatable relative to the shaft;

upper and lower ball bearings having outer races filled with a grease and mounted on the shaft at upper and lower portions for rotatably supporting the hub;

a rotor magnet mounted onto the hub;

a stator mounted on the shaft so as to face the rotor magnet;

a labyrinth seal including a first member mounted on the hub and a second member mounted on the shaft and disposed axially outside of the upper and lower bearings; and an oil absorbing means disposed at a contact portion of the hub and the first member for absorbing the grease oozing from the ball bearings.

6. A spindle motor according to claim 5, wherein the annular absorbing member is made of elastic material and has an inner diameter slightly larger than an outer diameter of the first member.

7. A spindle motor according to claim 5, wherein the oil absorbing means includes an annular recess formed on the rotor hub and an annular absorbing member accommodated in the annular recess so as to be in contact with the outer peripheral surface of the first member.

8. A spindle motor according to claim 5, wherein the oil absorbing means includes an annular recess formed on the first member and an annular absorbing member accommodated in the annular recess so as to be in contact with an inner peripheral surface of the rotor hub.

9. A spindle motor comprising:

a stationary shaft;

a rotor hub rotatable relative to the shaft;

upper and lower ball bearings having outer races filled with a grease and mounted on the shaft at upper and lower portions thereof for supporting a rotation of the hub;

a rotor magnet mounted on the hub;

a stator mounted on the shaft so as to face the rotor magnet;

a ferrofluidic seal having an annular holding member mounted on the hub and an outer ball bearing race, the ferrofluidic seal disposed axially outside of the upper and lower bearings; and an annular trap portion having a plurality of communicating channels formed in the annular holding member for taking therein the grease oozing from the ball bearings.

10. A spindle motor according to claim 9, wherein the communicating channels are arranged at predetermined angular intervals.

11. A spindle motor comprising:

a stationary shaft;

a rotor hub rotatable relative to the shaft;

upper and lower ball bearings filled with a grease and mounted on the shaft at upper and lower portions thereof for supporting a rotatably supporting the hub;

a rotor magnet mounted onto the hub;

a stator mounted on the shaft so as to face the rotor magnet;

a labyrinth seal including a first member mounted on the hub and a second member mounted on the shaft, the labyrinth seal disposed axially outside of the upper and lower bearings; and an annular trap portion having a plurality of communicating channels formed in the first member for taking therein the grease oozing from the ball bearings.

12. A spindle motor according to claim 11, wherein the communication channels are arranged at predetermined angular intervals.

13. A spindle motor comprising:

a stationary shaft;

a rotor hub rotatable relative to the shaft;

upper and lower ball bearings filled with a grease and mounted on the shaft at upper and lower portions for rotatably supporting the hub;

a rotor magnet mounted on the hub;

a stator mounted on the shaft so as to face the rotor magnet;

a ferrofluidic seal having an annular holding member mounted on an inner surface of the hub and an axially outer surface of an outer race of a ball bearing and an oil absorbing means including an annular recess formed on the rotor hub and an annular absorbing member accommodated in the annular recess so as to be in contact with an outer peripheral surface of the annular holding member, the oil absorbing member disposed between the hub and the annular holding member for absorbing the grease oozing from the bearing.

14. A spindle motor according to claim 13, wherein the annular absorbing member is made of elastic material and has an inner diameter slightly larger than an outer diameter of the annular holding member.

15. A spindle motor comprising:

a stationary shaft;

a rotor hub rotatable relative to the shaft;

upper and lower ball bearings filled with a grease and mounted on the shaft at upper and lower portions thereof for rotatably supporting the hub;

a rotor magnet mounted on the hub;

a stator mounted on the shaft so as to face the rotor magnet;

a ferrofluidic seal having an annular holding member mounted on an inner surface of the hub and an axially outer surface of an outer race of a ball bearing; and an oil absorbing means including an annular recess formed on the annular holding member and an annular absorbing member accommodated in the annular recess so as to be in contact with an inner peripheral surface of the rotor hub, the oil absorbing member disposed at a contact portion of the hub and the annular holding member for absorbing the grease oozing from the bearing.

16. A spindle motor according to claim 15, wherein the annular absorbing member is made of elastic material and has an inner diameter slightly larger than an outer diameter of the annular holding member.

17. A spindle motor comprising:

a stationary shaft;

a rotor hub rotatable relative to the shaft;

upper and lower ball bearings filled with a grease and mounted on the shaft at upper and lower portions thereof for rotatably supporting the hub;

a rotor magnet mounted on the hub;

a stator mounted on the shaft so as to face the rotor magnet;

a labyrinth seal including a first member mounted on an inner surface of the hub and a second member mounted on an outer peripheral surface of the shaft, the labyrinth seal disposed axially outside of the upper and lower bearings; and an oil absorbing means including an annular recess formed on the rotor hub and an annular absorbing member accommodated in the annular recess so as to be in contact with an outer peripheral surface of the first member, the oil absorbing member disposed at a contact portion of the hub and the first member for absorbing the grease oozing from the bearing.

18. A spindle motor according to claim 17, wherein the annular absorbing member is made of elastic material and has an inner diameter slightly larger than an outer diameter of the annular holding member.

19. A spindle motor comprising:

a stationary shaft;

a rotor hub rotatably supported on the shaft;

upper and lower ball bearings filled with a grease and mounted on the shaft at upper and lower portions thereof for supporting a rotation of the hub;

a rotor magnet mounted on the hub;

a stator mounted on the shaft so as to face the rotor magnet;

a labyrinth seal including a first member mounted on an inner surface of the hub and a second member mounted on an outer peripheral surface of the shaft, the labyrinth seal disposed axially outside of upper and lower bearings; and an oil absorbing means including an annular recess formed on the first member and an annular absorbing member accommodated in the annular recess so as to be in contact with an inner peripheral surface of the rotor hub, the oil absorbing means disposed at a contact portion of the hub and the first member for absorbing the grease oozing from a bearing.

20. A spindle motor according to claim 19, wherein the annular absorbing member is made of elastic material and has an inner diameter slightly larger than an outer diameter of the annular holding member.

21. A spindle motor comprising:

a stationary shaft;

a rotor hub rotatable relative to the shaft;

upper and lower ball bearings filled with a grease and mounted on the shaft at upper and lower portions thereof for rotatably supporting the hub;

a rotor magnet mounted onto the hub;

a stator mounted on the shaft so as to face the rotor magnet;

means for sealing an interior of the motor; and oil absorbing means for absorbing the grease oozing from the bearings, the oil absorbing means including an annular trap portion and a plurality of communicating channels arranged at regular intervals in the circumferential direction of the annular trap portion.

* * * * *

UNITED STATES PATENT AND TRADEMARK OFFICE
Certificate

Patent No. 5,821,646                                                 Patented: October 13, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Hiroshi Matsumoto, Junko Satake, Hiromi Iida and Koji Tomita.

Signed and Sealed this Fifteenth Day of June, 1999.

<div style="text-align:right">

BRIAN W. BROWN
*Special Program Examiner*
Technology Center 2800
Semiconductors, Electrical
and Optical Systems
and Components </div>